(12) United States Patent
Gershtein et al.

(10) Patent No.: US 7,784,502 B2
(45) Date of Patent: Aug. 31, 2010

(54) METHOD AND SYSTEM OF SUPPLY AND DELIVERY OF PRODUCT CONTAINED IN A CARRIER

(75) Inventors: Vladimir Yliy Gershtein, Allentown, PA (US); Karen M. Campbell, Coopersburg, PA (US); Paul Anthony Mattiola, Coopersburg, PA (US); Derek Miller, Emmaus, PA (US); Thomas Joseph, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1175 days.

(21) Appl. No.: 11/398,961

(22) Filed: Apr. 6, 2006

(65) Prior Publication Data

US 2006/0226050 A1 Oct. 12, 2006

Related U.S. Application Data

(60) Provisional application No. 60/669,522, filed on Apr. 8, 2005, provisional application No. 60/707,036, filed on Aug. 10, 2005.

(51) Int. Cl.
*B65B 1/04* (2006.01)
(52) U.S. Cl. .................. 141/100; 141/21; 141/18; 141/231
(58) Field of Classification Search .............. 141/2, 141/4–7, 18, 94, 100, 231, 232
See application file for complete search history.

(56) References Cited

U.S. PATENT DOCUMENTS 4,211,537 A 7/1980 Teitel (Continued)

FOREIGN PATENT DOCUMENTS

EP 0 003 588 8/1979

(Continued)

OTHER PUBLICATIONS

U.S. Appl. No. 10/430,246, filed May 6, 2003, Pez, Guido Peter, et al.

(Continued)

*Primary Examiner*—Gregory L Huson
*Assistant Examiner*—Jason K Niesz
(74) *Attorney, Agent, or Firm*—Michael K. Boyer

(57) ABSTRACT

Systems and methods for supply and delivery of a product incorporated into a carrier are provided. In one embodiment, the invention comprises a system that comprises a fresh storage vessel for receiving and storing fresh. The system further includes a fresh transferring apparatus communicably linked to the fresh storage vessel for transferring of fresh to a user when the user is connected to the transferring apparatus. The system further includes a spent storage vessel for receiving and storing spent (spent being defined as fresh with at least some product and/or product element removed therefrom), and a spent transferring apparatus communicably linked to the spent storage vessel for transferring spent from a user when the user is connected to the transferring apparatus. Optionally, the system further includes of an intermediate spent storage vessel disposed in the communicable connection between the spent transferring apparatus and the spent storage vessel. The intermediate spent storage vessel optionally includes a controllable communicable connection for selective transfer of spent from the intermediate storage vessel to a contamination storage vessel or the spent storage vessel. The carrier may be in any physical state or any combination thereof. In addition, the carrier may involve any known mechanism to capture, retain, or release product, for example, chemical reaction, adsorption, dilution, among others.

22 Claims, 5 Drawing Sheets

Schematic of simple loading and unloading operation example

U.S. PATENT DOCUMENTS

| | | | |
|---|---|---|---|
| 4,531,656 A | 7/1985 | Nitchman et al. |
| 5,148,945 A | 9/1992 | Geatz |
| 5,292,030 A | 3/1994 | Kateman et al. |
| 5,417,346 A | 5/1995 | Ferri, Jr. et al. |
| 5,579,233 A | 11/1996 | Burns |
| 5,758,571 A | 6/1998 | Kateman et al. |
| 5,803,599 A | 9/1998 | Ferri, Jr. et al. |
| 5,923,572 A | 7/1999 | Pollock |
| 5,952,117 A * | 9/1999 | Colborn et al. | 429/27 |
| 5,992,686 A | 11/1999 | Cline et al. |
| RE36,510 E | 1/2000 | Burns |
| 6,374,870 B1 | 4/2002 | Muller |
| 6,382,264 B1 | 5/2002 | Tsai et al. |
| 6,402,938 B1 | 6/2002 | Moore et al. |
| 6,536,523 B1 | 3/2003 | Kresnyak et al. |
| 6,558,825 B1 * | 5/2003 | Faris et al. | 429/17 |
| 6,616,036 B2 | 9/2003 | Streicher et al. |
| 6,655,155 B2 | 12/2003 | Bishop |
| 6,745,801 B1 | 6/2004 | Cohen et al. |
| 6,802,875 B1 | 10/2004 | Kimbara et al. |
| 8,802,875 | 10/2004 | Kimbara et al. |
| 6,834,508 B2 | 12/2004 | Bradley et al. |
| 7,169,489 B2 * | 1/2007 | Redmond | 429/12 |
| 7,226,676 B2 * | 6/2007 | Faris et al. | 429/17 |
| 2003/0108601 A1 | 6/2003 | Chrai et al. |
| 2003/0206102 A1 | 11/2003 | Joao |
| 2004/0223907 A1 | 11/2004 | Pez et al. |
| 2005/0002857 A1 | 1/2005 | Pez et al. |
| 2005/0090704 A1 | 4/2005 | Roettger et al. |
| 2006/0060817 A1 * | 3/2006 | Tempel et al. | 252/181.3 |
| 2006/0118201 A1 | 6/2006 | Li et al. |
| 2006/0239905 A1 | 10/2006 | Gershtein et al. |
| 2007/0034532 A1 | 2/2007 | Gershtein et al. |

FOREIGN PATENT DOCUMENTS

| | | |
|---|---|---|
| EP | 0 862 423 | 9/1998 |
| EP | 1 081 780 | 3/2001 |
| EP | 1 081 780 A | 3/2001 |
| JP | 06-100096 A1 | 4/1994 |
| JP | 2001-068138 A1 | 3/2001 |
| JP | 2004-501495 A1 | 1/2004 |
| JP | 2005009062 | 1/2005 |
| JP | 2005-527501 A1 | 9/2005 |
| WO | WO 97/02898 | 1/1997 |
| WO | WO 98/01118 | 1/1998 |
| WO | 01/99222 A | 12/2001 |
| WO | WO 03/061047 | 7/2003 |
| WO | 2004/076945 A1 | 9/2004 |

OTHER PUBLICATIONS

U.S. Appl. No. 10/833,467, filed Apr. 27, 2004, Bagzis, Larry et al.
U.S. Appl. No. 10/833,484, filed Apr. 27, 2004, Pez, Guido Peter et al.
U.S. Appl. No. 10/948,277, filed Sep. 23, 2004, Tempel, Daniel et al.
U.S. Appl. No. 11/208,723, filed Aug. 23, 2005, Tempel, Daniel et al.
U.S. Appl. No. 11/398,965, filed Apr. 6, 2006, Vladimir Yliy Gershtein.
U.S. Appl. No. 11/398,960, filed Apr. 6, 2006, Vladimir Yliy Gerwshtein et al.

* cited by examiner

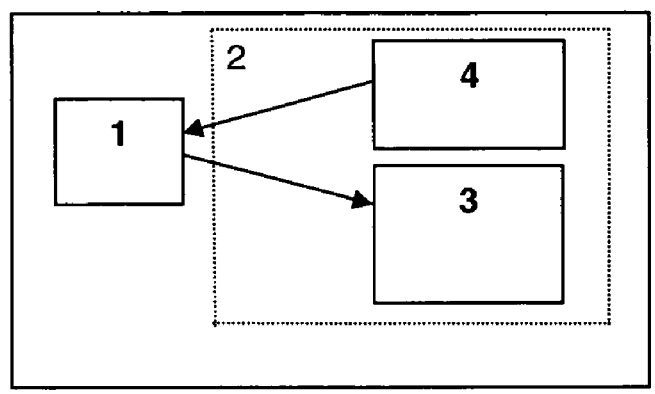
Figure 1 – Schematic of simple loading and unloading operation example

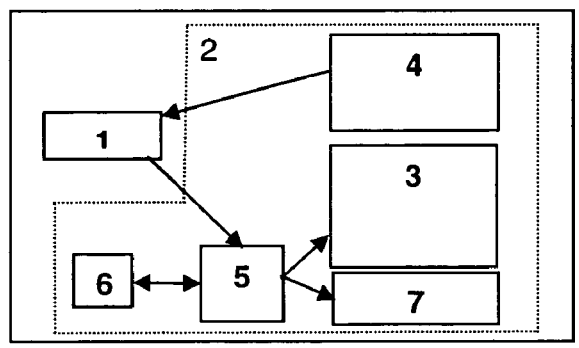
Figure 2 Schematic of a controlled loading/unloading operation at a refilling station

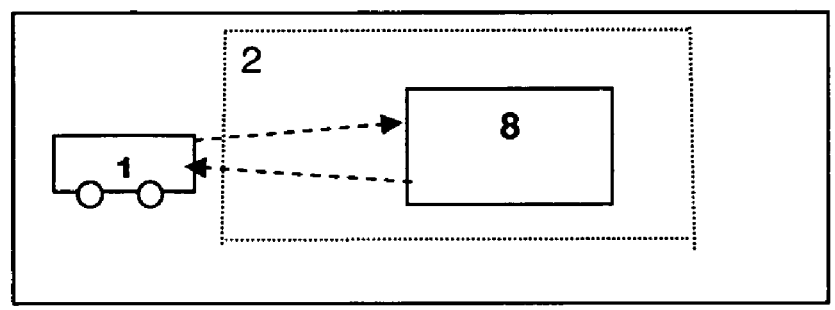
Figure 3. Schematic of refilling site with onsite rehabilitation system.

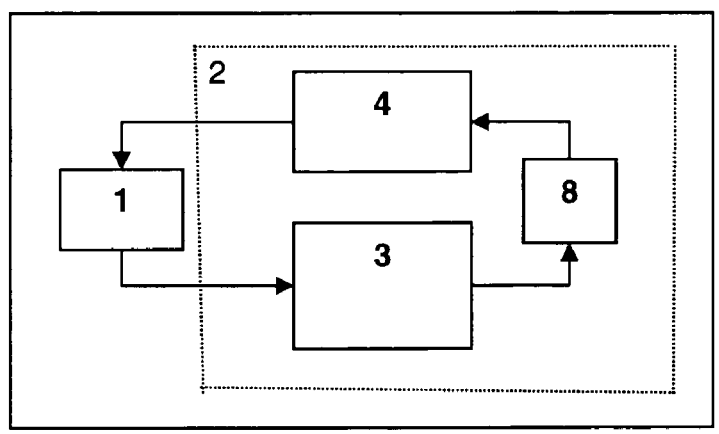
Figure 4. Schematic of refilling process at a site with rehabilitation capabilities

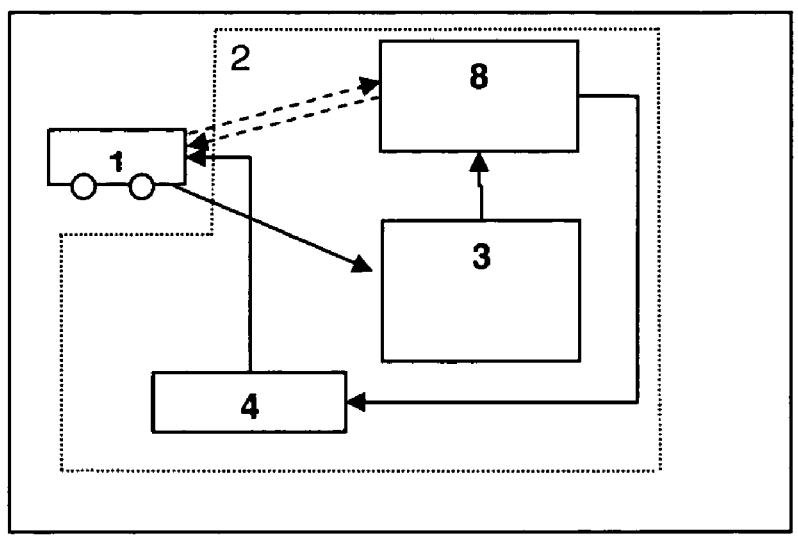
Figure 5. Schematic of an aspect of the process illustrated in Figure 4

METHOD AND SYSTEM OF SUPPLY AND DELIVERY OF PRODUCT CONTAINED IN A CARRIER

CROSS-REFERENCE TO RELATED APPLICATIONS

This application claims the benefit of Provisional Application No. 60/669,522, filed on Apr. 8, 2005 and application Ser. No. 60/707,036, filed on Aug. 10, 2005. The disclosure of these Provisional Applications is hereby incorporated by reference.

The subject matter of the instant invention is related to the following commonly assigned patents and patent application Ser. No. 10/430,246, filed May 6, 2003 and entitled "Hydrogen Storage by Reversible Hydrogenation of Pi-Conjugated Substrates" (now Publication No. US2004-0223907-A1); Ser. No. 10/833,467, filed Apr. 27, 2004 and entitled "Method of Delivering a Reversible Hydrogen Storage Fuel to a Mobile or Stationary Fuel Source"; and Ser. No. 10/833,484, filed Apr. 27, 2004 and entitled "Hydrogen Storage By Reversible Hydrogenation Of Pi-Conjugated Substrates"; U.S. patent application Ser. No. 11/398,965, filed of even date herewith and entitled "Secure Loop System and Method For Supply and Delivery of Product Contained in a Carrier"; and U.S. patent application Ser. No. 11/398,960, filed of even date herewith and entitled "Efficient System and Method For Delivery of Product and Return of Carrier." The disclosure of these patents and patent applications is hereby incorporated by reference. These patents and patent applications disclose carrier, spent, fresh and products that can be used in accordance with the instant invention.

BACKGROUND OF THE INVENTION

The instant invention relates to a systems and methods for delivering, distributing, selling and exchanging carrier, product, fresh and spent. The carrier releasably incorporates at least one product. In one aspect of the invention, methods are provided for incorporating a product (e.g., an otherwise gaseous or unstable chemical product), such as hydrogen, within a carrier (i.e., fresh as defined herein), distributing fresh to a user, and recovering spent (i.e., comprising at least one dehydrogenated carrier) for rehabilitation, which may include regeneration.

By way of background, hydrogen-based fuel cells are viewed as a replacement for conventional means of generating electricity, and hydrogen is viewed as potential fuel substitution for conventional internal combustion engines (ICE). While such hydrogen-based systems are desirable, hydrogen supply, delivery, and storage may provide a number of technical challenges. A typical hydrogen delivery truck carries hydrogen at low cryogenic temperature and elevated pressure. One alternative method employs compressed gas. Compressed gas supply may be limited, for example, by storage capacity. Another alternative comprises sorbents, for example, metal hydride sorbents, which may not be sufficient for this usage due to weight constraints. There is a need in this art for method of providing product for fuel cells or ICE usage in a safe, efficient and cost-effective manner. There is also a need in this art for methods that provides a simple, efficient, and low-cost transaction that can be implemented by all product customer groups, including but not limited to vehicle operators, filling stations, and other users.

Conventional methods and systems for distributing product are disclosed in Cohen, Joseph Perry and Copeman, Tama Maya, "Mobile hydrogen generation and supply system", U.S. Pat. No. 6,745,801 B1, 8 Jun. 2004; Bradley, Keith, Kwon, Young-Kyun, Gruner, George, Wyatt, Jeff, Jhi, Seung-Hoon, Gabriel, Jean Christophe, "Hydrogen storage and supply system", U.S. Pat. No. 6,834,508B2, 28 Dec. 2004; Metsiger, Pierre, "Pharmaceutical Composition for Oral Delivery" Patent Application WO98/01118 and EP0862423A1, 15 Jan. 1998; Vickers, Michael T., Jianhua, Yan and Monson, Robert J., "Comprehensive Product Delivery System" Pat. Application WO9702898, 30 Jan. 1997; Chrai, Suggy S., Murari Ramaswamy, "Liquid Pharmaceutical for Oral Delivery" U.S. Patent Application Publication No. U.S.20030108601 A1, 12 Jun. 2003; Moore, Howard F. and Shaffer, Jr., Arthur G in U.S. Pat. No. 6,402,938B1, "Vaporization of used motor oil with non-hydrogenating recycle vapor"; Kresnyak, Steve and Braun, Alex in U.S. Pat. No. 6,536,523B1, "Water treatment process for thermal heavy oil recovery" published on Mar. 25, 2003; and, YAMADA MASAO in JP2005009062A "WASTE PAPER FIBROUS MATERIAL UTILIZING SYSTEM AND WASTE PAPER DEFIBRATING MACHINE" published on Jan. 13, 2005. The disclosure of the previously identified patents and publications is hereby incorporated by reference.

However, none of the above references adequately solve the problems addressed by the present invention.

BRIEF SUMMARY OF THE INVENTION

The instant invention solves or avoids problems that arise when conventional methods are used for supplying chemical product. The invention provides a carrier that includes at least one chemical as a product, as well as systems and methods for delivering, distributing, transferring, separating, collecting and detecting. The inventive method and systems also comprise distributing carrier between the various carrier operational and distribution locations as well as to the user locations. The carrier can comprise a composition manufactured so as to include product, or a previously manufactured composition that is processed to incorporate product. Product can be released from the carrier by using any suitable means or method thereby generating spent. The systems and methods further provide for collecting spent. The collected spent can be rehabilitated to provide a carrier that can be regenerated to provide fresh.

In one embodiment, the invention is a system for distributing a product releasably incorporated within a carrier. The system comprises a fresh storage vessel for receiving, storing, and dispensing fresh, fresh being defined as the carrier containing the product and/or product elements. The system further includes a fresh dispensing apparatus communicably linked to the fresh storage vessel for dispensing of fresh to a user when the user is connected to the dispensing apparatus. The system further includes a spent storage vessel for receiving, storing, and dispensing of spent, spent being defined as fresh with at least some product and/or product element removed therefrom, and a spent removal apparatus communicably linked to the spent storage vessel for removing spent from a user when the user is connected to the removal apparatus. Optionally, the system further includes of an intermediate spent storage vessel disposed in the communicable connection between the spent removal apparatus and the spent storage vessel. The intermediate spent storage vessel optionally includes a controllable communicable connection for selective transfer of spent from the intermediate storage vessel to a contamination storage vessel or the spent storage vessel.

In a second embodiment, a system is provided for distributing a product releasably incorporated within a carrier, the system comprising a fresh storage vessel for receiving, storing, and dispensing fresh, and a fresh dispensing apparatus communicably linked to the fresh storage vessel for dispensing of fresh to a user when the user is connected to the dispensing apparatus. The system further includes a spent storage vessel for receiving, storing, and dispensing of spent, and a spent removal apparatus communicably linked to the spent storage vessel for removing spent from a user when the user is connected to the removal apparatus. The system further includes an on-site rehabilitation system including means for receiving spent from the spent storage vessel, and further including means for rehabilitating spent into fresh.

In a third embodiment, the invention provides methods for distributing a product releasably incorporated within a carrier. The methods include the steps of: providing a fresh storage vessel for receiving, storing, and dispensing fresh, fresh being defined as the carrier containing the product or product elements; providing a fresh dispensing apparatus communicably linked to the fresh storage vessel for dispensing of fresh to a user when the user is connected to the dispensing apparatus; providing a spent storage vessel for receiving, storing, and dispensing of spent, spent being defined as fresh with at least some product and/or product element removed therefrom; providing a spent removal apparatus communicably linked to the spent storage vessel for removing spent from a user when the user is connected to the removal apparatus; and connecting a user to either of the fresh dispensing apparatus or the spent removal apparatus.

Other features and advantages of the present invention will be apparent from the following more detailed description of certain embodiments, taken in conjunction with the accompanying drawings which illustrate, by way of example, the principles of the invention.

The instant systems and methods can be employed for delivering a carrier material with included product (fresh) such as hydrogen wherein the hydrogen can be released in a manner suitable for consumption such as in a fuel cell or an ICE (e.g., by a dehydrogenation reaction). Fresh has the ability to be processed so that it can release hydrogen thereby becoming spent. Spent then may be regenerated back into fresh by rehabilitation to contain hydrogen or its elements (e.g., hydrogen is removed from fresh and hydrogen is added to rehabilitate spent for reuse as fresh). A list of specific carriers capable of reversibly carrying, for example, hydrogen may be found in US patent applications US2004/0223907 and US2005/0002857 (hereby incorporated by reference), and may include but not limited to the following: perhydroindolo[3,2,1-jk]carbazole, perhydrodibenzofuran, dodecahydrobiphenylene, perhydro-N,N'-diethyl-bis-indolymethane, perhydro-N-ethylcarbazole, perhydro-N-methylcarbazole, and 10-methyl-10H-phenoxazine. The instant invention delivers and/or dispenses fresh while collecting spent. The presence of a carrier in both streams of delivered fresh and returned spent is addressed by the instant invention.

The inventive method and systems comprises exchanging at least a portion of fresh for at least a portion of spent on a substantially equal basis. By "substantially equal basis", it is meant that a defined amount of spent corresponds generally to a defined amount of fresh that is dispensed (e.g., into a reservoir of a vehicle). Such amounts may not be identical due to various reasons such as, for example, product withdrawal from fresh and possibly variations in delivery equipment in use, measurement devices, computer control systems or other losses associated with removing product from fresh, among other causes for variation. The inventive method and systems also comprise distributing carrier between the various carrier operational and distribution locations as well as to the user locations (e.g., from the carrier manufacturer and/or rehabilitation to a distribution station or to a filling station interface).

The following defined terms are used herein:

"Product" comprises any chemical that is capable of being releasably stored in a carrier. By way of non-limiting example, product may comprise hydrogen, fluorine, chlorine, oxygen, arsine, stibine, phosgene, methane, hydrogen fluoride, gases containing boron, phosphorus, aluminum, or silicon components, and combinations thereof. By way of further example, product may be incorporated into a carrier fully intact (such as $H_2$), and/or as elements of a product (such as H bound to another non-H molecule), so long as the elements can be reassembled to form product after release from a carrier.

"Carrier" comprises a substance or mixture of substances that is able to incorporate a product or product elements, and to release the product, thereby becoming fresh and spent reversibly. There may be different carriers for the same product, one carrier for multiple products, or different carriers for different products. By way of non-limiting examples, carrier may comprise one or more of organic compounds (e.g., ionic liquids, solvated compounds, among others)

"Fresh"—the carrier when it incorporates product or product elements.

"Spent"—the carrier when depleted or partially depleted of product or product elements. Spent may exhibit some similar chemical and/or physical properties as fresh and/or the carrier. However, spent will have at least one detectable chemical and/or physical difference when compared to fresh, such as, but not limited to, different phases, specific gravity, viscosity, density, vapor pressure, ignition point, miscibility, and other known chemical and/or physical properties.

"User" is any entity, person, or device capable of receiving at least one of fresh, spent, carrier, product, and product elements. By way of non-limiting example, a user may be a fuel cell, a combustion engine, filling station, industrial process, distribution system, or any other device or system.

"Regeneration" comprises any process that incorporates a carrier with a product or product elements. By way of non-limiting example, where a product is hydrogen, regeneration could be hydrogenation of an unsaturated organic carrier.

"Rehabilitation" comprises restoring spent into fresh. Rehabilitation may include product manufacture, carrier manufacture, regeneration, recycling, purification, analysis and testing, and other similar processes.

Other features and advantages of the present invention will be apparent from the following more detailed description of certain embodiments, taken in conjunction with the accompanying drawings which illustrate, by way of example, the principles of the invention.

BRIEF DESCRIPTION OF SEVERAL VIEWS OF THE DRAWINGS

FIG. 1 is a schematic of a loading and unloading system.

FIG. 2 is a schematic of a loading and unloading system at a refilling station.

FIG. 3 is a schematic of a refilling station or site with onsite rehabilitation.

FIG. 4 is a schematic of a refilling process at a site with rehabilitation.

FIG. 5 is a schematic of an aspect of the process illustrated in FIG. 4.

Numbering of the various elements in the figures is intended to maintain consistency of the description of the numbered elements, and to illustrate the interaction and potential interchangeability of some elements.

DETAILED DESCRIPTION OF THE INVENTION

The techniques described below are related to a method or system wherein a product (e.g., hydrogen), is contained in a carrier. In general, the carrier may be in any physical state such as a solid, liquid, vapor, plasma, or any combination of the above. The carrier can include at least one additive for modifying at least one chemical or physical property of the carrier (e.g., an additive to lower the freezing point of the carrier). In addition, the carrier may involve any suitable mechanism to capture, retain, or release product, for example, chemical reaction, absorption, adsorption, dissolution, dilution, those disclosed in the aforementioned commonly assigned patents and patent applications, among other mechanisms. In general, the carrier is used to contain a product or product elements. The carrier with contained product or its elements (i.e. fresh), is used to store and/or transport the product. Fresh may be transported by using methods or equipment known in the art (e.g. ISO containers, cylinders, rail car containers, etc). Once product is removed, the product depleted carrier (i.e., spent), may be returned back for rehabilitation using the same or different equipment that is used for delivery of fresh. When rehabilitated, the carrier becomes fresh and is containing the product or its elements again. The entire operation and delivery system of carrier distribution should be conducted in a manner that is efficient and/or reduces the potential for contamination of carrier. For example, a purged connect/disconnect equipment may be used to prevent air from coming into the fresh or spent holding capacity in the case when air may be a contaminant to fresh, spent, or carrier. Devices such as, for example, isolation valves, caps, plugs, etc., may be used while the connecting ends are in transit or not in service to prevent contamination such as spider webs, bug remains, water, road dirt, etc. The primary product described herein is hydrogen; however, the various aspects described herein may be useful for other products that can be releasably incorporated into a carrier. While one desirable aspect of the invention relates to the ability to rehabilitate spent, if desired, the carrier (alone or with product) may have value in other applications, for example, the carrier can be used as fuel in an internal combustion engine (ICE).

A product enriched carrier (i.e., fresh), may be loaded onto a user (device), for example a vehicle, power generator, distribution facility, chemical processing system, among others (e.g. which are capable of storing carrier, separating carrier from product and/or consuming the product). As product is being removed from fresh, spent is generated and may be stored in a storage capacity (e.g., a vessel associated with the vehicle and belonging to the user). The storage capacity may be the same or different from that for fresh. For example, in one embodiment, two separate storage vessels may be used, where one is used only for fresh and the other one is used only for spent. In the other embodiment, one vessel with a stationary separating wall may be used defining two separate compartments of said vessel. Each compartment may be dedicated to either fresh or spent. Yet in the other embodiment, one vessel with a divider may be used, wherein a divider may comprise at least one of: i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each Spent may have to be removed and replaced by fresh once all or substantially all product capacity is consumed. Replacement of spent by fresh may take place during a refilling operation. The product separating device may continue functioning during and/or after the refilling operation is completed. There are different ways to exchange spent for fresh or regenerate spent. For example, rehabilitation of spent on board of a device (e.g., on board a vehicle), rehabilitation at a refilling site (e.g., onsite rehabilitation), rehabilitation at a remote site (e.g. manufacturing), spent is exchanged for fresh on a defined exchange basis, etc. In addition, the rehabilitation unit may be stationary, mobile, or a combination of both. Also, the user may be stationary, for example, power generator, individual house or building, industrial applications; mobile, for example, vehicles with fuel cell, distribution trailer, etc.; or portable, for example, power tools, cell phones, computers with fuel cells, among other applications.

In one exemplary aspect of the invention, the delivery means is associated with the carrier (fresh and spent) in such a way that product delivery, carrier transfer, and carrier transportation delivery is achieved. Delivery means can comprise at least one of a pipeline, mobile transportation system such as a truck or barge, among other suitable means. The carrier is contained within the delivery means so that when a quantity of fresh carrier is transferred at a location, a substantially equal amount of spent carrier is transferred. Transferring means for a carrier can comprise any suitable device capable of transferring a carrier from one entity to another entity. While any suitable transferring means can be used, examples of components of transferring device include pipeline, hose, nozzle, or dispenser.

In general, product, fresh, and spent may be different molecules. That is, hydrogen incorporated into the carrier may form a completely different material or substance from what both were separately. One example of a product and carrier combination may be hydrogen, quinoline, perhydroquinoline, and 1,2,3,4-tetrahydroquinoline. Quinoline (e.g. spent) combined with hydrogen through hydrogenation may form perhydroquinoline (e.g. fresh). Through dehydrogenation to release product, partially dehydrogenated perhydroquinoline may become 1,2,3,4-tetrahydroquinoline (e.g. spent) or fully dehydrogenated quinoline (e.g. spent). Another example of a product and carrier combination may comprise hydrogen, sodium borate, and sodium borohydride. Sodium borate may be processed in a manner that may become sodium borohydride, for example with a process that may or may not include the direct combination of hydrogen gas. Hydrogen may be released from sodium borohydride in a reaction with water and a catalyst. A further example of a product and carrier combination may comprise phosphine and at least one ionic liquid, for example using 1,3-dimethylimidazolium as the cation and $Al_2Cl_7^-$ as the anion. Phosphine may be removed from the ionic liquid (fresh carrier) by applying a pressure differential to the fresh carrier, i.e. a vacuum. Additional examples of suitable ionic liquids are disclosed in U.S. patent application Ser. Nos. 10/948,277 and 11/208,723 entitled "Ionic Liquid Based Mixtures For Gas Storage And Delivery" (hereby incorporated by reference). The product can be rehabilitated or released from the carrier by: 1) exposure to at least one catalyst, 2) applying or removing energy, for example heat, 3) applying or removing pressure, 4) combining with at least one reactant, 5) combinations of the foregoing, among other process parameters. The product can be released from the carrier by exposure to a plurality of systems and methods.

One example comprises exposing the carrier to a first method to release a portion of the product and thereafter exposing the carrier to a second method for releasing another portion of the product. The first and second methods can be the same method (e.g., conducted under different conditions) or distinct processes.

The potential presence of a carrier in both streams (i.e., delivered fresh and returned spent), presents new challenges, which have not been addressed in presently available supply and delivery logistics. For example, a vehicle stopped at a refilling station may have to exchange spent for fresh versus just receiving fuel such as, for example, gasoline. Examples of useful carriers and additional information regarding certain aspects of the embodiments described herein may be found in U.S. patent application Ser. No. 10/430,246 filed May 6, 2003; U.S. Ser. No. 10/833,467 filed Apr. 27, 2004; and U.S patent application Ser. No. 10/833,484 filed Apr. 27, 2005, all of which are incorporated in their entireties herein by reference.

Supply and delivery logistics may include loading and unloading of delivered materials to the user, for example, via a distribution system. Fresh and spent loading and unloading operation may impact how product is delivered to the user. A schematic of an exemplary loading/unloading operation is illustrated in FIG. 1. Note that hereafter numbering of all elements in all figures are kept the same for consistency of the description and to illustrate the interchangeability of these elements.

Referring now to FIG. 1, user 1, for example, a vehicle that consumes a product, i.e., hydrogen that is contained in a load of fresh inside user's holding tank, e.g., fuel tank. Once all or a part of a product is consumed, user 1 may refill product capacity at refilling site 2. Carrier deficient of product, i.e. spent, may be unloaded from user 1, for example from user's 1 fuel tank, into spent collection tank 3 located at the refilling site 2. Fresh may be loaded from storage 4 into user 1. Once the operation is completed a user's tank is at least partially filled, and user 1 has fresh ready for delivering product, for example, to a fuel cell.

In one system and method of the loading operation, substantially equal amounts of fresh and spent are loaded into user 1 from storage 4 and removed from user 1 to storage 3, respectively. The loading/unloading operation may take place through, for example, the use of dual nozzle dispenser described in U.S. patent application Ser. Nos. 10/430,246 and 10/833,467 (hereby incorporated by reference), or any other device capable of providing controlled loading and/or unloading operation. Substantially equal amounts of product, carrier, fresh and/or spent may be measured on substantially equal volume or mass basis, or may be measured on substantially equal product carrying capacity basis, among other suitable measurement methods. The latter describes the ability of the carrier to contain product after rehabilitation (e.g., re-hydrogenation). Also, because spent may be transformed into a molecule with different volume, mass, density and other properties than fresh, equal amount exchange specifically refers to the quantity of product that the carrier would be capable of containing if re-hydrogenated. For example, the spent volume may be about 80-85% of the fresh volume as it was measured during the lab experiments with the spent carriers Quinoline and N-ethylcarbazole. Hydrogen capacity of 5.7 wt. % was measured in N-ethylcarbazole when the latter was hydrogenated at 160° C. and 800 psia $H_2$ pressure and dehydrogenated at 180° C. and 15 psia $H_2$ pressure.

In order to minimize carrier contamination (e.g., at a central carrier storage, manufacturing or rehabilitation location), steps may be implemented for monitoring, identifying, or isolating the carrier. Local carrier contamination may lead to a massive carrier loss at a central carrier processing and/or collection location, or damage to the regeneration equipment. Examples of contamination may include presence of foreign material that may or may not be easily separated from the carrier but may render the carrier not suitable for reuse. Examples of contaminants can include, for example, water, oils, oxygen, among others. Carrier contamination may occur as a result of, for example, an accident, introduction of rain water into an open system; a result of normal or abnormal operations, for example carrier degradation, reactant or product carryover; or a result of unlawful actions, for example, intentional introduction of contaminants such as oils, slurries, etc. into a vehicle fuel tank. The loading/unloading operation may be modified to minimize carrier contamination and to avoid contamination of large carrier quantities. An example of such a loading/unloading operation is depicted in FIG. 2 where another schematic of a refilling station is shown.

Referring now to FIG. 2, user 1 is involved in loading/unloading operations at a user 2, such as a refilling station. In some cases, there may be multiple users that are conducting loading/unloading operations, for example vehicles refilling at the refilling station. As previously shown in FIG. 1, refilling station 2 may have onsite storages of fresh 4 and spent 3, respectively.

Optionally, refilling station 2 may also have additional intermediate collection tank 5, which is not shown in FIG. 1 of the refilling station but depicted in FIG. 2. This intermediate collection tank 5 may be smaller in size compared to holding tank 3. In addition, a number of intermediate tanks at a refilling station can correspond to the number of refilling dispensers. Intermediate tank 5 can be used to accept spent from a single user or multiple users. Tank 5 can be used for temporary isolation of a load of spent received from a single user and, therefore, providing controlled unloading operation. Spent in tank 5 can be analyzed by instrumentation means 6, such as but not limited to viscometers, conductivity and density measuring devices, chemical analyzers, gas analyzers, chromatographs, ultraviolet/visible sensors (UV/Vis), light and infrared light (IR) sensors, microwave sensors, nuclear magnetic resonance (NMR) spectroscopy, magnetic susceptibility, laser technology, and the like, before the contents of tank 5 are transferred further. For example, analysis based on viscosity measurements were shown feasible to implement as fresh/spent quality control measures. It was demonstrated that a carrier viscosity, light absorption properties, etc., may change during hydrogenation/dehydrogenation cycle. For example, in laboratory experiments of the carriers N-ethylcarbazole, tetrahydro-N-ethylcarbazole, and perhydro-N-ethylcarbazole, the viscosity of perhydro-N-ethylcarbazole increases 7.4 times as it is dehydrogenated. All numbers measured using a Brookfield dynamic viscometer with #2 spindle at 100 rpm were as follows: Perhydro-N-ethylcarbazole N-ethylcarbazole 13.5 centipoise and Tetrahydro-N-ethylcarbazole 100 centipoise. Such a difference in viscosity allows generation of a fresh/spent control curve for fresh/spent quality analysis. In another example, perhydro-N-ethylcarbazole (e.g. fresh), IR can be used to identify the formation of N-ethylcarbazole (e.g. spent). There are multiple bands related to aromatic C—H bending at 1230, 747, and 721 $cm^{-1}$. Yet in another example, for perhydro-N-ethylcarbazole, UV/Vis can be used to identify the formation of N-ethylcarbazole. The $\pi\text{->}\pi^*$ transition at 270 nm is absent in perhydro-N-ethylcarbazole and grows as aromatic intermediates form and is strongest when fully dehydrogenated to N-ethylcarbazole. A calibration could be set up to quantify the amount of dehydrogenation based upon the intensity of this band.

The results of the analysis may be used to determine spent quality, grade, nature, level of contamination, among other characteristics. The following may be implemented once the results are obtained:
- collected spent may be transferred to storage 3 if analysis are favorable or are not conclusive but determined to be low risk,
- collected spent may be transferred into contamination storage 7 if analyses are not favorable or are not conclusive.

As it was mentioned above, tank 5 may accommodate the spent from one or multiple users. For example, if analytical methods used for spent quality check are capable to complete the check during refilling operation time, then tank 5 capacity may be equal to a maximum tank capacity of a user, for example 60 gallons tank. If on the other hand the employed analytical methods and equipment are not capable to complete the analysis of the unloaded spent during refilling operation, then tank 5 capacity may be equal to a product of the user tank volume and ratio of the required analysis time to the required refilling time. The latter logic may be shown as following:

- If $A_{time} \leq R_{time}$ then $V_{Tank5} = V_{user}$

- If $A_{time} \geq R_{time}$ then $V_{Tank5} = V_{user} \times \dfrac{A_{time}}{R_{time}}$ Where:
$A_{time}$ is time required for spent analysis
$R_{time}$ is time required for refilling operation
$V_{tank5}$ is a desired volume of tank 5
$V_{user}$ is a defined maximum user tank volume Analytical equipment may be unavailable or partially available for immediate use, for example when refilling station 2 is a small capacity or mobile. Samples of received spent may be taken and stored at refilling station 2 until the analytical equipment becomes available or may be processed at a designated site equipped with analytical capabilities. In this case, spent collected from each user may reside in individual volumes, or may be mixed and analyzed as a single unload at a site where analytical equipment is available. Collected samples may be used to track individual spent contributors for future identification or other records including financial operations and transactions.

In general, refilling station 2 may be equipped with at least one and, if desired, more then one spent or fresh holding tanks similar to 3 and 4 to accommodate different product carriers. In addition, refilling station 2 may have multiple storages functionally equivalent to contamination storage 7 or intermediate tank 5, for example if the different carriers have the potential to be contaminants to each other. Instrumentation means 6 may contain different means to collect and/or store samples of spent if necessary. Such a procedure may ensure localization of contaminated spent.

If desired, a suitable single storage can be divided into two or more compartments as, for example, described in patents U.S. Pat. Nos. 6,802,875B1, 6,382,264B1, and WO03061047A1; hereby incorporated by reference. Thus, spent and fresh can be separated in a single storage, and/or normal condition spent can be separated from possibly contaminated spent. Also, a number of divided spent/fresh tanks may be used to accommodate different carriers Loading/unloading operations may include onsite rehabilitation devices. An example of a schematic of the refilling operation utilizing onsite rehabilitation unit is shown in FIG. 3. Referring now to FIG. 3, user 1 is at refilling site 2, and the refilling site is equipped with onsite carrier rehabilitation system 8. Rehabilitation system 8 may include various components necessary for rehabilitation of spent into fresh. Therefore, rehabilitation system 8 may be a complex system including product manufacture, product(s) contained in a product storage unit(s), heat treating system(s) for effective heat removal or generation, and supply as necessary for rehabilitation processes, analytical and measuring systems, among other processes and systems.

Spent is unloaded from user 1 into rehabilitation unit 8 and replaced with fresh. Such a procedure may be the most effective when spent and fresh are typically exchanged on a substantially equal basis. Equal basis exchange in this case may be defined, for example, as equal basis by volume, or by mass, or by product contained capacity. In order to monitor the exchange of spent and fresh, system 8 may include at least one device or means, which measures product content in the carrier. For example, product content may be determined by measuring fresh or spent density and comparing the results to those defined in a pre-established density curve. In general, each carrier may have its own pre-established quality control curves. In another example, product content may be monitored in order to communicate to the user the quantity/quality of product in the carriers that are being loaded/offloaded. Density measurements conducted with a carrier comprising hydrogenated Quinoline show that density may vary by as much as 10% increasing when the contained hydrogen level is decreasing. For example, density of spent comprising Quinoline was measured at 1.093 g/cc. When Quinoline is fully hydrogenated, it (as a carrier) becomes fresh comprising Perhydroquinoline with measured density of 0.933 g/cc and carrier that is only partially spent becomes, for example, 1,2,3,4-Tetrahydroquinoline with measured density of 1.061 g/cc. Other methods may be used, such as but not limited to, for example, UV and IR sensors or refractive index based measurements as was mentioned above. The ability to measure product content can be useful since a carrier may deteriorate with time and may gradually lose product carrying capacity. Similar device may be installed at user 1 as an onboard device and may be used as, for example, a product content monitoring gauge. A product content monitoring device may be based on measurements of, for example, physical, chemical, electrical, optical, or any other properties of the carrier with or without product contained. In addition, the device may be constructed utilizing differential or absolute measurement techniques. For example, measuring density of the carrier with product once per established unit time, for example, every five minutes and comparing it to a standard pre-established density data for a given carrier may provide the user with information on amount of product left in the carrier or on how well product is removed by a product removal device, for example dehydrogenation unit. Different computing or display systems may be employed to integrate obtained information into a format convenient for a specific user.

The schematic depicted in FIG. 3 also illustrates how the same carrier unloaded from user 1 may be used to load a product, for example hydrogen, back into a storage device of user 1. Such an arrangement may help to minimize possibility of carrier contamination, for example, since the user may retain the ownership of their specific carrier thus the carrier does not get combined with the carrier of other users. It may be desirable for use by wholesalers or retailers of product for example if risk of any carrier combining is eliminated.

An example of an alternative schematic for the system illustrated in FIG. 3 is depicted in FIG. 4. Referring now to FIG. 4, refilling site 2 may be equipped with spent collection storage 3, carrier rehabilitation system 8, and fresh storage 4. This schematic is similar to that in FIGS. 1 and 2 with an addition of rehabilitation unit 8. User 1 may unload spent into spent collection storage 3 and receive fresh from fresh storage 4. Fresh storage 4 is replenished by rehabilitation unit 8 processing spent received from storage 3.

Another refilling arrangement is shown in FIG. 5. Referring now to FIG. 5, refilling site 2 is equipped with spent collection storage 3, carrier rehabilitation system 8, and fresh storage 4. The difference versus schematic depicted in FIG. 4 is that user 1 may interact directly with rehabilitation unit 8 thereby by-passing both spent and fresh storages 3 and 4, e.g., the system depicted in FIG. 5 becomes functionally equivalent to the one illustrated in FIG. 3.

As in the previous examples, rehabilitation system 8 may include all necessary attributes to rehabilitate spent into fresh when spent is fed into rehabilitation unit 8 from spent storage 3 or directly from user 1. In addition, rehabilitation system 8 may include materials such as product, carrier, reactants, additives, catalysts, etc. and/or means to manufacture those materials.

Rehabilitation system 8 may replenish storage 4 with fresh and/or may replenish user 1 directly from rehabilitation system 8 as shown in FIG. 5. Therefore, refilling station 2 shown in FIG. 5 may combine the abilities to refill users directly from rehabilitation unit 8 and/or from fresh storage 4. If desirable, storage 3 and 4 may also be used with dedicated capacities serving one user at a time as stated above in the description of a system depicted in FIG. 2. As an example, when a vehicle needs to be refilled with fresh containing hydrogen, and the rehabilitation time is less than or equal to the desired vehicle refilling time (the time to exchange spent for fresh), the vehicle may retain its own carrier, and have its own spent rehabilitated. In this case, the carrier may be rehabilitated in system 8 shown in FIG. 5 and reloaded back into user 1 directly without being mixed with other carriers from other users or storages.

In another embodiment, a portion of rehabilitation system 8 may be partially user 1 with some rehabilitation functions remaining at refilling location 2. For example, a vehicle may have a re-hydrogenation unit located on-board the vehicle. In this example, the re-hydrogenation unit may require process support from auxiliary system residing at refilling station 2. This system may support processes such as, for example, liquid hydrogen storage, hydrogen delivery via supply line, heat removal, etc. Such an auxiliary system may reside at refilling station 2. In addition, the carrier may not be required to leave the vehicle for rehabilitation.

The user and the refilling station may have means to remove carrier from the user's storage for reasons other than rehabilitation. In this case, it may be desirable to equip the refilling site with the ability to perform specialized operations with fresh and spent such as, for example, removal of spent without replenishing with fresh, carrier exchange, one direction fresh fill operation, etc.

In another embodiment, spent rehabilitation is performed as a central operation at the refilling site 2 and there is more than one user, which requires spent rehabilitation at the same time. User 1a, 1b, 1c, among others, may have spent unloaded into spent storage 3 and reloaded from fresh storage 4. In this case, the onsite rehabilitation system is exposed to circulation of the carrier from multiple users. An example of such a system may be a refilling station servicing several vehicles with a central rehabilitation system. In this embodiment, the refill operation may involve details described above and depicted in FIG. 2, which may help to avoid or minimize carrier contamination.

The rehabilitation unit and carrier storage may be located in a specially designated area. This area may be connected with refilling points by different means, such as, for example, pipelines, a closed loop system of mobile specialized containers, etc. The refilling points may be organized at locations that users may visit for prolonged time period such as, for example, long and short term parking lots.

Carrier rehabilitation process may take some time, which is, for example, longer than a desirable vehicle refilling time. Therefore, Storage 3 and/or 4 may be designed, for example, to help refilling station 2 to operate during maximum refilling demand. In this case the rehabilitation unit may continue to operate. Such an operation typically makes the system more economical and reliable.

The operations and systems of the instant invention may be manual, automated and combinations thereof. The operations and systems may include data collection and/or data use for, as example, identification, measurement, and other uses.

All loading and unloading operations can be performed simultaneously, sequentially, in parallel, or exclusive of each other. For example, one might want to replenish a vehicle fuel tank due to loss of carrier, therefore, only fresh will be loaded into the vehicle. This operation may involve special procedures and equipment such as, for example, dispensers with special flow organization; security devices such as, for example, special valves; ID controllers associated with car, refilling station, person performing refilling, or other required identification data; data collection systems; databanks; computer networks; etc. Information on these special procedures and equipment are disclosed in U.S. Pat. No. 6,616,036B2, US2003/0206102A1, U.S. Pat. Nos. 5,923,572, 6,374,870B1, 5,579,233A, EP003588A2, and U.S. Pat. No. Re. 36510E, incorporated in their entireties herein by reference.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for distributing a product releasably incorporated within a carrier, the system comprising:
   a fresh storage vessel for receiving and storing fresh wherein the fresh comprises at least one product;
   a means for transferring fresh that is communicably linked to the fresh storage vessel for transferring fresh to a user when the user is connected to the fresh transferring means;
   a spent storage vessel for receiving and storing spent;
   a means for transferring spent that is communicably linked to the spent storage vessel for transferring spent from a user when the user is connected to the spent transferring means a contamination storage vessel;
   a means for analyzing spent for contamination; and
   an intermediate spent storage vessel wherein the intermediate spent storage vessel is disposed in communicable connection between the spent transferring means and the spent storage vessel, wherein the intermediate spent storage vessel further includes a controllable communicable connection for selective transfer of contaminated spent from the intermediate storage vessel to the contamination storage vessel and uncontaminated spent to the spent storage vessel.

2. The system of claim 1, wherein the system comprises a filling station for a vehicle that utilizes the product as a fuel source.

3. The system of claim 1, wherein the fresh transferring means and spent transferring means are controlled so as to operate to load fresh onto and remove spent from a user on a substantially equal exchange basis.

4. The system of claim 1, wherein the spent storage vessel further includes means for delivering spent to a rehabilitation facility.

5. The system of claim 4, wherein the means for delivering spent to a rehabilitation facility comprise at least one member selected from the group consisting of: i) a direct connection to an on-site rehabilitation facility; ii) a spent dispensing apparatus capable of connection to a mobile rehabilitation facility; and iii) a spent dispensing apparatus capable of connection to a mobile storage vessel for transport to a remote rehabilitation facility.

6. The system of claim 1, wherein the means for analyzing spent comprises means for detecting at least one chemical or physical property of fresh, product, spent, carrier, or any combination thereof.

7. The system of claim 6, wherein the detecting means comprises at least one member selected from the group consisting of: viscometers, conductivity and density measuring devices, chemical analyzers, gas analyzers, chromatographs, ultraviolet/ visible sensors (UV/Vis), light and infrared light (IR) sensors, microwave sensors, nuclear magnetic resonance (NMR) spectroscopy, magnetic susceptibility, and laser technology.

8. The system of claim 1, wherein the product comprises at least one member selected from the group consisting of hydrogen, fluorine, chlorine, oxygen, arsine, stibine, phosgene, methane, hydrogen fluoride, gases containing boron, phosphorus, aluminum, or silicon components, and combinations thereof.

9. The system of claim 1 wherein the carrier comprises at least one ionic liquid.

10. The system of claim 1, wherein the product comprises hydrogen, wherein the carrier comprises at least one dehydrogenated organic chemical, wherein fresh comprises at least one hydrogenated derivative of the organic chemical, and wherein spent comprises at least one at partially dehydrogenated derivative of the fresh.

11. The system of claim 1 wherein said vessels comprise means for separating fresh from spent and comprises at least one member selected from the group consisting of: fixed dividers within the user storage vessel; movable dividers within the user storage vessel; a bladder within the user storage vessel; chemical separation of fresh and spent based upon inherent or modified properties of each; physical separation of fresh and spent based upon inherent or modified physical properties of each; and a plurality of dedicated compartments for each of fresh and spent.

12. A system for distributing a product releasably incorporated within a carrier, the system comprising:
a fresh storage vessel for receiving and storing fresh wherein fresh comprises at least one product;
an apparatus for transferring fresh that is communicably linked to the fresh storage vessel for transferring fresh to a user when the user is connected to the fresh transferring apparatus;
a spent storage vessel for receiving, storing, and transferring spent;
an apparatus for transferring spent removal that is communicably linked to the spent storage vessel for transferring spent from a user when the user is connected to the spent transferring apparatus a contamination storage vessel;
a means for analyzing spent for contamination;
an intermediate spent storage vessel wherein the intermediate spent storage vessel is disposed in communicable connection between the spent transferring means and the spent storage vessel, wherein the intermediate spent storage vessel further includes a controllable communicable connection for selective transfer of contaminated spent from the intermediate storage vessel to the contamination storage vessel and uncontaminated spent to the spent storage vessel; and
an on-site rehabilitation system comprising means for receiving uncontaminated spent from the spent storage vessel, and further including means for rehabilitating spent into fresh.

13. The system of claim 12, wherein the means for analyzing spent comprises means for detecting at least one chemical or physical property of fresh, product, spent, carrier, or any combination thereof.

14. The system of claim 13, wherein the detecting means comprises at least one member selected from the group consisting of: viscometers, conductivity and density measuring devices, chemical analyzers, gas analyzers, chromatographs, ultraviolet/ visible sensors (UV/Vis), light and infrared light (IR) sensors, microwave sensors, and combinations thereof.

15. The system of claim 12, wherein the means for rehabilitating spent into fresh comprises regeneration means, product manufacture means, carrier manufacture means, recycling means, purification means, analysis means, testing means, and combinations thereof.

16. A method of distributing a product releasably incorporated within a carrier, the method comprising the steps of:
providing a fresh storage vessel for receiving, storing, and transferring fresh wherein the fresh comprises at least one product,
providing a fresh transferring means linked to the fresh storage vessel for transferring fresh to a user when the user is connected to the transferring means;
providing a spent storage vessel for receiving, storing, and transferring of spent;
providing a spent transferring means linked to the spent storage vessel for transferring spent from a user when the user is connected to the transferring means;
connecting a user to either of the fresh transferring means or the spent transferring means providing a contamination storage vessel;
analyzing spent for contamination; and,
providing an intermediate spent storage vessel wherein the intermediate spent storage vessel is disposed in communicable connection between the spent transferring means and the spent storage vessel, wherein the intermediate spent storage vessel further includes a controllable communicable connection for selective transfer of contaminated spent from the intermediate storage vessel to the contamination storage vessel and uncontaminated spent to the spent storage vessel.

17. The method of claim 16, wherein the step of connecting a user to either of the fresh transferring means or the spent transferring means comprises connecting the user to both the fresh transferring means and the spent transferring means, and further comprises transferring fresh to the user and transferring spent from the user.

18. The method of claim 17 wherein the step of connecting a user to either of the fresh transferring means or the spent transferring means comprises connecting the user to the spent transferring means, and further comprises transferring spent from the user.

19. The method of claim 16 wherein the step of connecting a user to either of the fresh transferring means or the spent transferring means comprises connecting the user to the fresh transferring means, and further comprises transferring fresh to the user.

20. The method of claim 16, wherein the step of analyzing comprises the step of detecting at least one chemical or physical property of fresh, spent, product, carrier, and combinations thereof.

21. A system for distributing a product releasably incorporated within a carrier, the system comprising:
- a rehabilitation facility; and
- a user, the user comprising:
  - a fresh storage vessel for receiving and storing fresh from the rehabilitation facility, fresh being the carrier containing the product; means for removing product from fresh to form spent;
  - a spent storage vessel for receiving and storing of spent,
  - a spent delivery apparatus communicably linked to the spent storage vessel for returning spent to the rehabilitation facility a contamination storage vessel;
  - a means for analyzing spent for contamination; and,
  - an intermediate spent storage vessel wherein the intermediate spent storage vessel is disposed in communicable connection between the spent transferring means and the spent storage vessel, wherein the intermediate spent storage vessel further includes a controllable communicable connection for selective transfer of contaminated spent from the intermediate storage vessel to the contamination storage vessel and uncontaminated spent to the spent storage vessel.

22. A system for distributing a product releasably incorporated within a carrier, the system comprising:
- a fresh storage vessel for receiving and storing fresh wherein the fresh comprises at least one product;
- a spent storage vessel for receiving and storing spent;
- a means for transferring fresh to the user and transferring spent from the user a contamination storage vessel;
- a means for analyzing spent for contamination; and,
- an intermediate spent storage vessel wherein the intermediate spent storage vessel is disposed in communicable connection between the spent transferring means and the spent storage vessel, wherein the intermediate spent storage vessel further includes a controllable communicable connection for selective transfer of contaminated spent from the intermediate storage vessel to the contamination storage vessel and uncontaminated spent to the spent storage vessel.

* * * * *

UNITED STATES PATENT AND TRADEMARK OFFICE
CERTIFICATE OF CORRECTION

| | | |
|---|---|---|
| PATENT NO. | : 7,784,502 B2 | Page 1 of 1 |
| APPLICATION NO. | : 11/398961 | |
| DATED | : August 31, 2010 | |
| INVENTOR(S) | : Vladimir Yliy Gershtein | |

It is certified that error appears in the above-identified patent and that said Letters Patent is hereby corrected as shown below:

Column 14, line 60 after the word "means" insert the words -- ; a contamination storage vessel; --.

Column 16, line 17 after the words "spent from the user" delete the words "a contamination storage vessel".

Column 16, line 22 after the words "spent transferring means" insert the words -- ; contamination storage vessel; --.

Signed and Sealed this
Fifteenth Day of May, 2012

David J. Kappos
*Director of the United States Patent and Trademark Office*